US012610231B2

(12) United States Patent
Ben-Shachar et al.

(10) Patent No.: US 12,610,231 B2
(45) Date of Patent: Apr. 21, 2026

(54) WIRELESS FINE TIME MEASUREMENT AUTHENTICATION

(71) Applicant: Texas Instruments Incorporated, Dallas, TX (US)

(72) Inventors: Matan Ben-Shachar, Ihud (IL); Oren Shani, Kfar-Saba (IL); Yaron Alpert, Hod Hasharon (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 572 days.

(21) Appl. No.: 17/406,059

(22) Filed: Aug. 18, 2021

(65) Prior Publication Data

US 2023/0055972 A1     Feb. 23, 2023

(51) Int. Cl.
　　*H04W 12/06*　　　(2021.01)
　　*H04L 1/1607*　　　(2023.01)
　　*H04L 9/40*　　　　(2022.01)

(52) U.S. Cl.
　　CPC ........... *H04W 12/06* (2013.01); *H04L 1/1607* (2013.01); *H04L 63/18* (2013.01); *H04L 2463/121* (2013.01)

(58) Field of Classification Search
　　CPC ...... H04W 12/06; H04L 1/1607; H04L 63/18; H04L 2463/121
　　See application file for complete search history.

(56) References Cited

U.S. PATENT DOCUMENTS

2016/0345277 A1*　11/2016　Segev ................. H04W 56/001
2017/0064575 A1*　3/2017　Eyal ......................... G06F 21/44

2017/0149799 A1*　5/2017　Vamaraju .............. H04W 64/00
2017/0257758 A1*　9/2017　Aldana .................. G01S 5/0244
2020/0128595 A1*　4/2020　Dees ..................... H04W 64/00
2022/0239639 A1*　7/2022　Jasleen .................. G06F 21/36

OTHER PUBLICATIONS

IEEE Standard for Information technology, IEEE Std 802. 11—2016, Part 11: Wireless LAN Medium Access Control (MAC) and Physical Layer (PHY) Specifications, New York, NY, Dec. 7, 2016, 3534 pgs.

* cited by examiner

*Primary Examiner* — Alexander Lagor
*Assistant Examiner* — Lydia L Noel
(74) *Attorney, Agent, or Firm* — Michelle F. Murray; Frank D. Cimino

(57) ABSTRACT

A Fine Time Measurement (FTM) authentication system and method include performing a FTM transaction comprising at least one FTM-ACK message pair transmitted and received via a first communication channel between two endpoints, where the at least one FTM-ACK message pair contains timestamp values of message departure time and message arrival time during the FTM transaction. At least one authenticating value indicative of timestamp values of the at least one FTM-ACK message pair arrival and departure times during the FTM transaction is then transmitted via a second communication channel. FTM timestamp values are recovered from the received at least one authenticating value, which are compared with the received FTM timestamp values. The received FTM timestamp values can be authenticated if there is a match between the recovered FTM timestamp values and the received FTM timestamp values.

17 Claims, 8 Drawing Sheets

WIRELESS FINE TIME MEASUREMENT AUTHENTICATION

FIELD

The present disclosure primarily relates to wireless communications and wireless networks, and is related in particular to a system and method for wireless Fine Time Measurement (FTM) authentication.

BACKGROUND

Wireless localization has been used with GPS (Global Positioning System) as a widely accepted positioning technique for mobile devices. There are a myriad of location-based applications that require dynamic real-time indoor accurate location and tracking capabilities. While the GPS functionality is generally available outdoors when GPS signals are not obscured by overhead structures, indoor positioning applications require a different solution. The introduction of IEEE 802.11-2016 specified a Fine Time Measurement (FTM) protocol for WiFi ranging to address indoor positioning applications or when GPS accuracy is degraded. FTM is a time-of-flight ranging measurement method that estimates distance by measuring the round-trip time (RTT) of a signal between two endpoints, typically a mobile device and an access point. When distances to three or more access points with known locations can be computed, a two-dimensional position estimate of the mobile device can be calculated using trilateration and/or triangulation. However, the FTM technique itself is not without challenges.

SUMMARY

In a first embodiment, a wireless communication authentication method includes receiving, via a first communication channel, a first FTM message including a previous FTM message departure timestamp and a previous corresponding ACK message arrival timestamp, and sending, via the first communication channel, a corresponding first ACK message in response to receiving the first FTM message. The method further includes receiving, via a second communication channel, an authenticating value indicative of the time of departure and arrival timestamp values of at least the first FTM message and at least the first corresponding ACK messages. The first FTM and ACK time of departure and arrival timestamps are authenticated in response to evaluating the authenticating value.

In a second embodiment, a device for performing Fine Time Measurement (FTM) authentication includes a wireless receiver configured to receive, via a first communication channel, a first FTM message including a previous FTM message departure timestamp and a previous corresponding ACK message arrival timestamp. The device further includes a wireless transmitter configured to transmit, via the first communication channel, a corresponding first ACK message in response to receiving the first FTM message. The device further includes a receiver configured to receive, via a second communication channel, an authenticating value indicative of the time of departure and arrival timestamp values of at least the first FTM message and at least the first corresponding ACK messages. The device employs logic that is configured to evaluate the authenticating value and authenticate the first FTM and ACK time of departure and arrival timestamps in response to evaluating the authenticating value.

In a third embodiment, a non-downloadable computer-readable medium encoded with a computer-executable method of detecting hacking of a Fine Time Measurement (FTM) transaction includes receiving, via a first communication channel, a first FTM message including previous FTM message departure timestamp and previous corresponding ACK message arrival timestamp, sending, via the first communication channel, a corresponding first ACK message in response to receiving the first FTM message, receiving, via the first communication channel, a second FTM message including time of departure timestamp of the first FTM message and a time of arrival timestamp for the corresponding first ACK message, and sending, via the first communication channel, a corresponding second ACK message in response to receiving the second FTM message. The method further includes receiving, via a second communication channel, an authenticating value indicative of the time of departure and arrival timestamp values of at least one of the first and second FTM messages and at least one of the first and second corresponding ACK messages, and authenticating the time of departure and arrival timestamps in response to evaluating the authenticating value.

DETAILED DESCRIPTION

The proposed solution addresses WiFi hacking prevention when the FTM message frames are intercepted and spoofed in what is commonly called "man in the middle" attacks. These malicious attacks result in inaccurate location calculation of the mobile device. The proposed solution employs the use of a secure or reliable side channel separate from the communication channel used to transmit the Fine Time Measurement (FTM) message frames to transmit one or more authenticating values that can be used to verify the received FTM timestamp data, thus detect hacking and prevent measurement FTM manipulation (spoofing).

Figure 1:
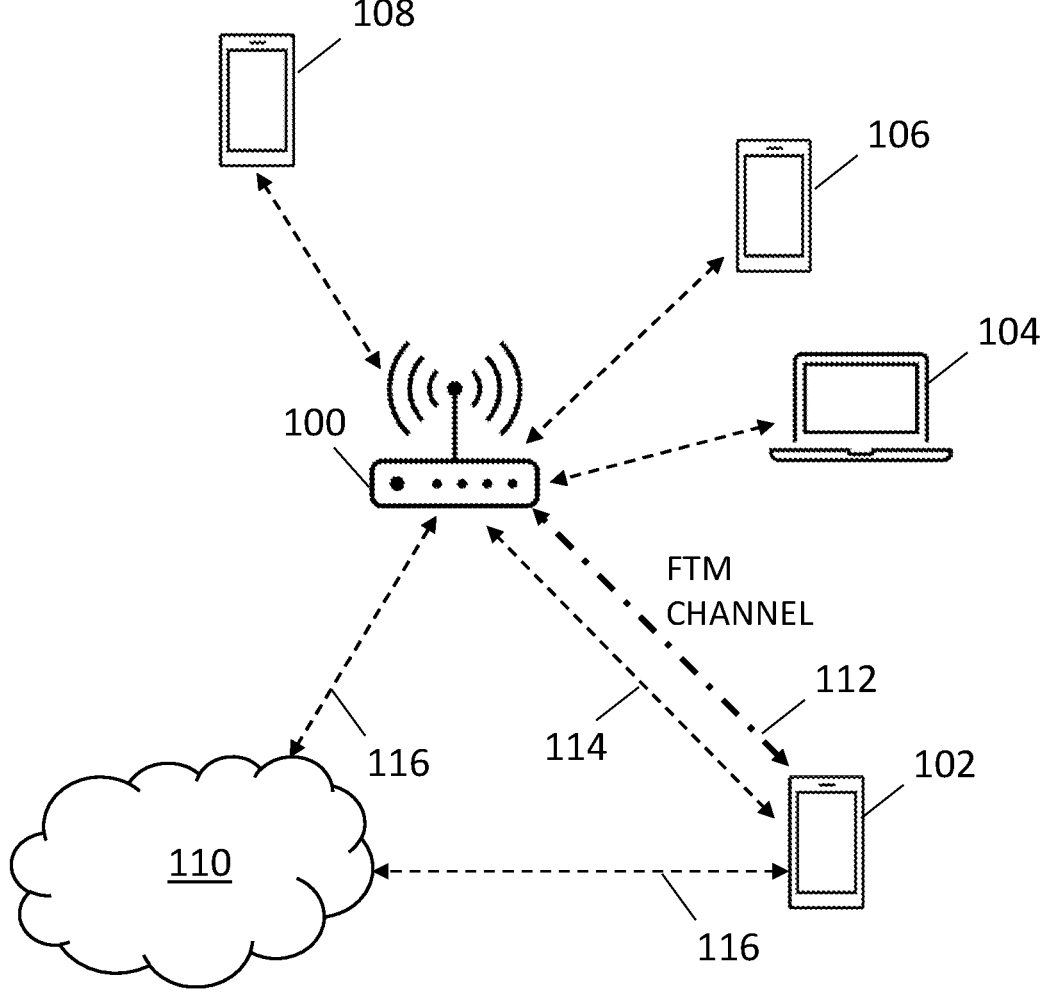
FIG. 1 is a simplified block diagram illustrating the proposed secure FTM authentication solution according to one or more aspects of the present disclosure.

FIG. 1 is a simplified block diagram illustrating a typical wireless local area network or WLAN including an access point 100 and a plurality of mobile devices and computing devices 102-108 in communication with one another directly and indirectly via the Internet 110. The mobile devices 102-108 also may communicate with other remote computing devices (not explicitly shown) via the Internet 110. Although the use of the Fine Time Measurement (FTM) protocol specified by IEEE 802.11-2016 enables position estimation in indoor applications, this technique is vulnerable to malicious "man in the middle" attacks, where the unencrypted FTM messages transmitted on a FTM channel 112 between an initiator (e.g., a mobile device) 100 and a responder (e.g., an access point) 102 are intercepted and spoofed. The spoofed FTM messages containing incorrect timestamps cause the round-trip time (RTT) calculations at the initiator 102 to yield erroneous location results.

The proposed solution uses a side channel (114, 116) other than the channel 112 used to transmit the FTM and ACK message frames to transmit one or more message containing authenticating values in a secure or reliable manner between the initiator 100 and responder 102. The authenticating value(s) is preferably a hash value calculated by applying a hash function to one or more FTM timestamps. Alternatively, the authenticating value may comprise the actual timestamps or may be generated using another type of function. As illustrated in FIG. 1, the side channel may be a direct channel 114 between the initiator 100 and responder 102, or it may be an indirect side channel 116 that is passed through the Internet 110 or a third computing device(s), for example.

Figure 2:
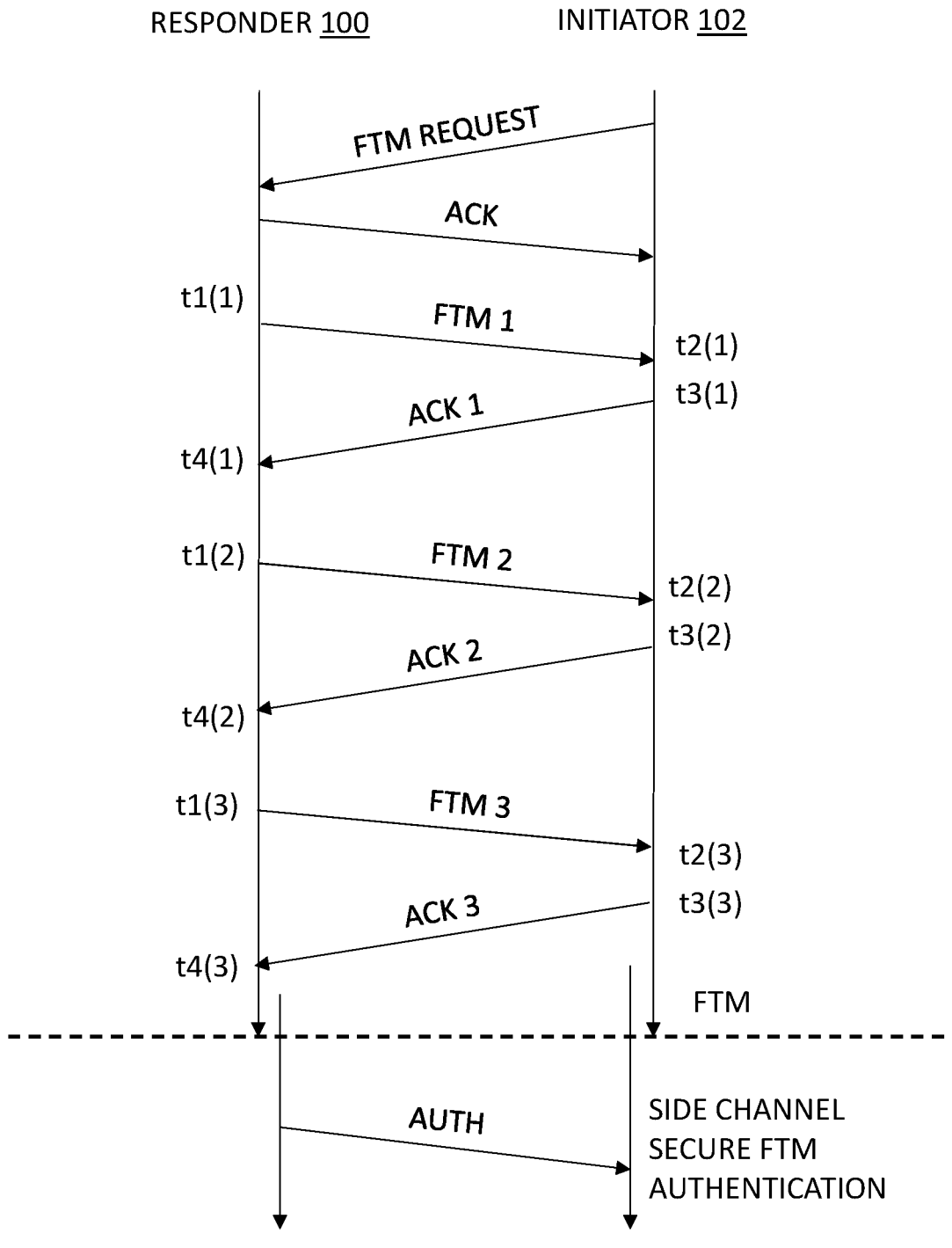
FIGS. 2-5 are simplified message flow diagrams illustrating various embodiments of the method for secure FTM authentication according to one or more aspects of the present disclosure.

FIG. 2 is a simplified message flow diagram of a FTM session between an initiating STA or initiator 102 and a responding STA or responder 100 according to the IEEE 802.11-2016 standard. The initiator 102 is a station (e.g., mobile device) that initiates the FTM process by sending a FTM Request frame to a device functioning as an access point. Within a Parameters element of the Request frame, the initiator may also include values such as the burst duration, FTM frames per burst, bandwidth, and minimum time between consecutive FTM frames. The access point that supports the FTM procedure as a responding device is referred to as a responder 100. In response to the FTM Request, the responder 100 sends an acknowledgement reply (ACK) back to the initiator 102 to indicate an agreement to participate in a FTM ranging transaction. A FTM transaction involves the exchange of one or more sets of FTM and ACK message frames between two endpoints, where timestamps of message departure and message arrival are part of the information that is transmitted and received. The responder 10 sends a first FTM message (FTM 1) to the initiator 102, and waits for its acknowledgement (ACK 1) from the initiator 102. The FTM 1 message contains the time of departure timestamp (t1=ToD) for the FTM 1 message, and the acknowledgement message, ACK 1, contains the time of arrival timestamp (t2=ToA) for the FTIM 1 message and the time of departure timestamp (t3=ToD) for ACK 1. The responding STA then sends timestamps t1 and t4 to the initiating STA as part of the next Fine Timing Measurement frame (FTM 2). The round trip time (RTT) can then be computed by the responder 100 based on the ToD timestamp of the FTM 1 message (t1), the ToA timestamp of the FTM 1 message (t2), the ToD timestamp of the ACK 1 message (t3), and the ToA timestamp of the ACK 1 message (t4). The responder 100 may send multiple FTM messages and wait for the acknowledgement each time. The example shown in FIG. 2 shows a FTM transaction with a burst of three FTM messages (FTM 1, FTM 2, FTM 3) with a corresponding ACK reply (ACK 1, ACK 2, ACK 3) for each FTM message. The round trip time or RTT for each FTM and ACK pair, and the average RTT for n FTM messages are computed by:

$$RTT = [(t4 - t1) - (t3 - t2)];$$

$$\text{Average } RTT = \frac{1}{n}\left(\sum\nolimits_{k=1}^{n} t_4(k) - \sum\nolimits_{k=1}^{n} t_1(k)\right) - \frac{1}{n}\left(\sum\nolimits_{k=1}^{n} t_3(k) - \sum\nolimits_{k=1}^{n} t_2(k)\right)$$

The initiator may also calculate the clock offset by computing [(t2-t1)−(t4-t3)]/2. A malicious "man in the middle" attack replaces or modifies the FTM and/or ACK messages.

An inaccurate RTT calculation caused by corrupted timestamps leads to an incorrect distance calculation and position determination for the mobile device (initiator 102). A proposed solution is to transmit the timestamps or the hash values of the timestamps using a secure side communication channel so that the timestamp values transmitted during the FTM transaction can be authenticated with the authenticating values (timestamps or a hash of the timestamps) transmitted using the secure side channel.

In FIG. 2, an authenticating value (e.g., a hash value) computed based on all of the timestamps t1 and t4 of the three FTM messages, i.e., the entire FTM transaction, is transmitted from the responder to the initiator via the secure side channel. The hash value transmitted to the initiator 102 as the authenticating value is then unhashed (reversed) by the initiator to recover the t1 and t4 timestamps. The recovered timestamp values are then compared with the timestamps received by the initiator during the FTM transaction. If the timestamp values are the same, then the FTM timestamps are verified and no hacking has been detected. The authenticating value transmitted from the responder to the initiator may be the timestamps themselves instead of a hash value.

Figure 3:
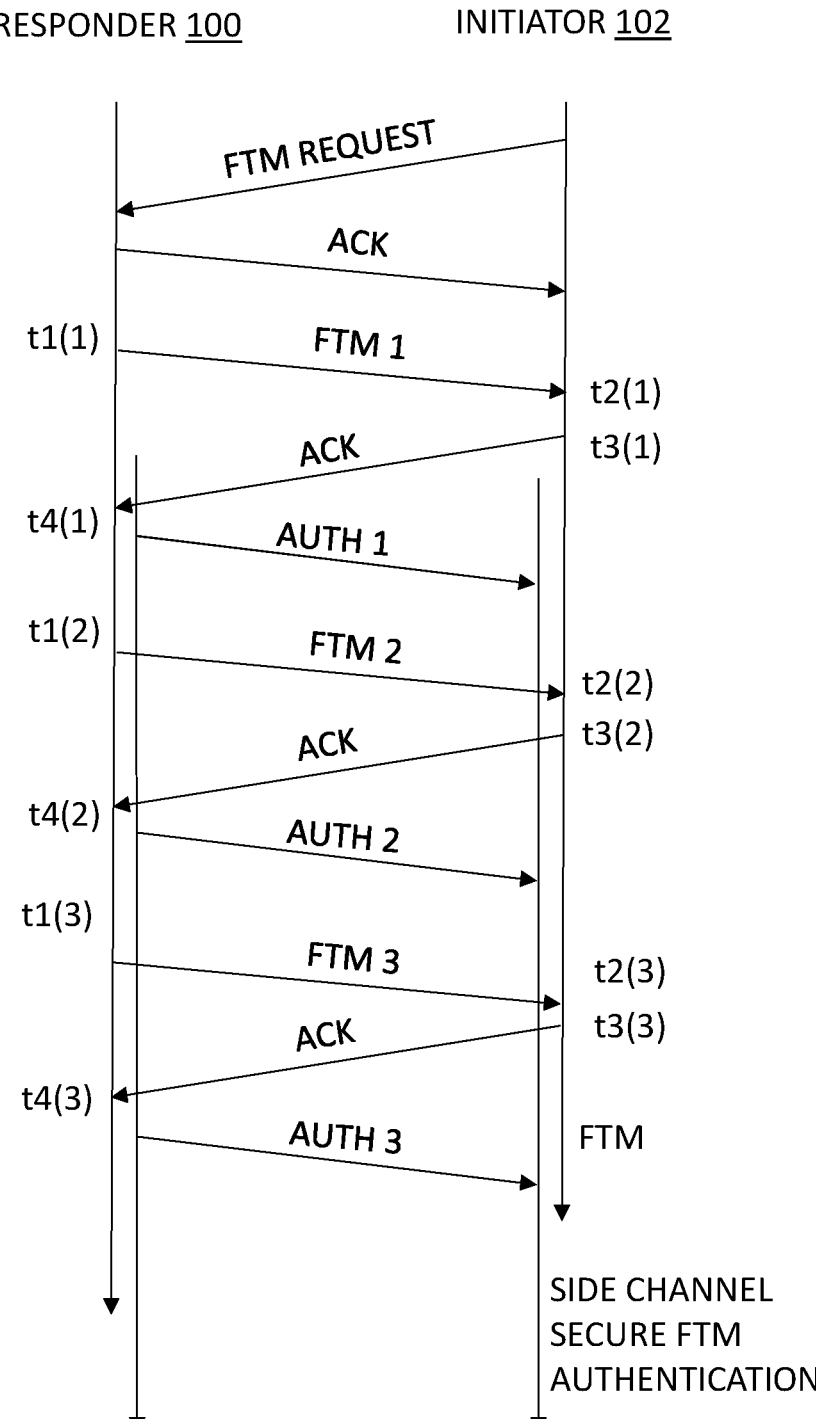

As shown in FIG. 3, an alternate embodiment of the FTM timestamp authentication process transmits the authenticating values (AUTH 1-3), e.g., timestamps or hash values, over the secure side channel after the completion of each FTM and ACK message pair. In this embodiment, a hash function of t1 and t4 timestamps may be computed for each pair of FTM and ACK messages by the responder 100, and transmitted to the initiator 102 before the next round of FTM-ACK messages. The initiator 102 receives the hash value of t1 and t4 timestamps, unhashes the value to recover the timestamps, and compares them to its own record of the t1 and t4 timestamps. If the timestamp values match, then the FTM timestamps have been authenticated.

Figure 4:
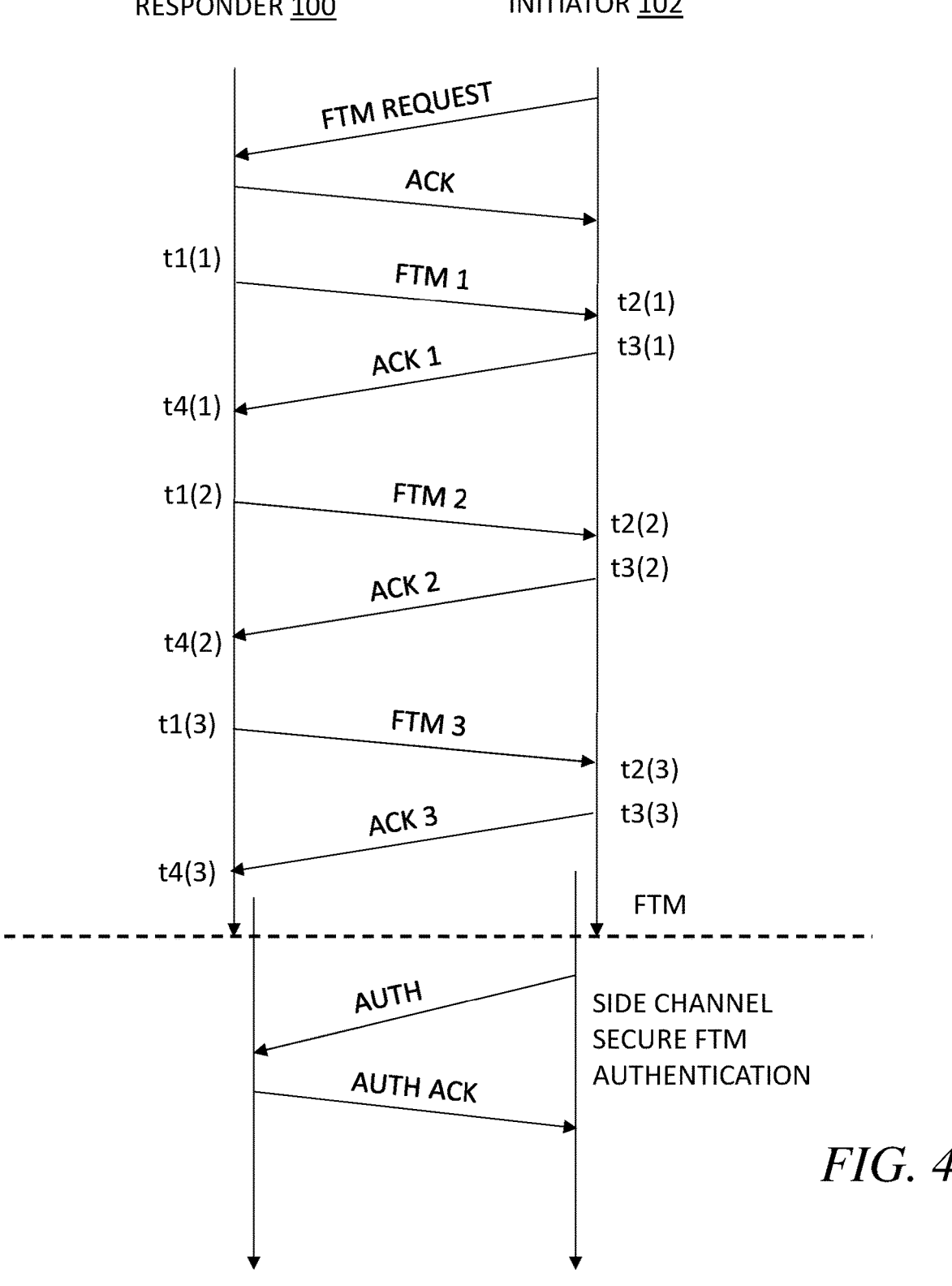
Figure 5:
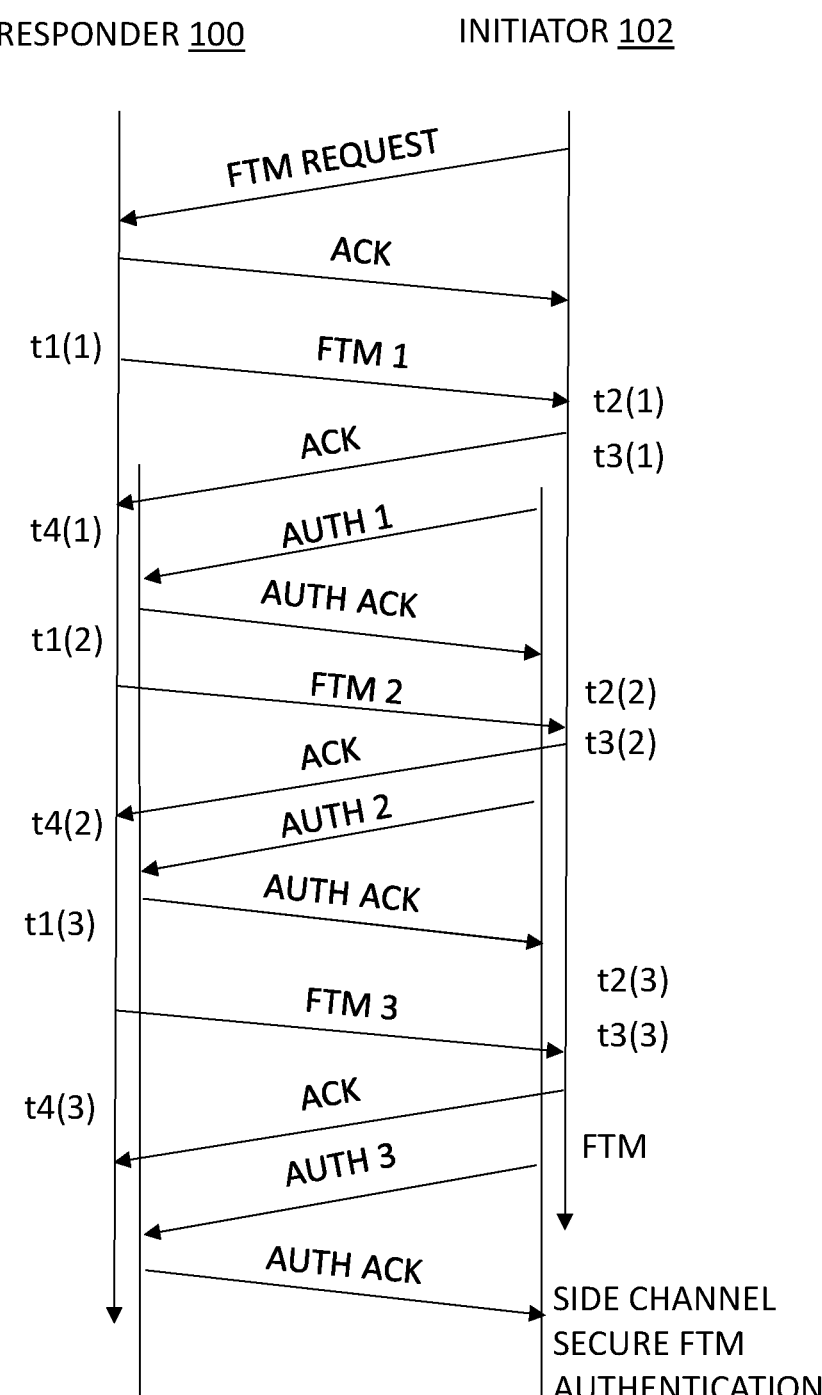

As shown in FIGS. 4 and 5, the authenticating value(s) may be transmitted in the other direction, i.e., from the initiator 102 to the responder 100, to verify the timestamp values by the responder by sending AUTH message by the initiator. An AUTH ACK message sent from the responder to the initiator may be used to acknowledge the receipt of the authenticating values by the responder 100 in these scenarios. The content of the AUTH ACK messages may also be used to indicate that the timestamps have been verified or hacking/spoofing has been detected.

Figure 6:
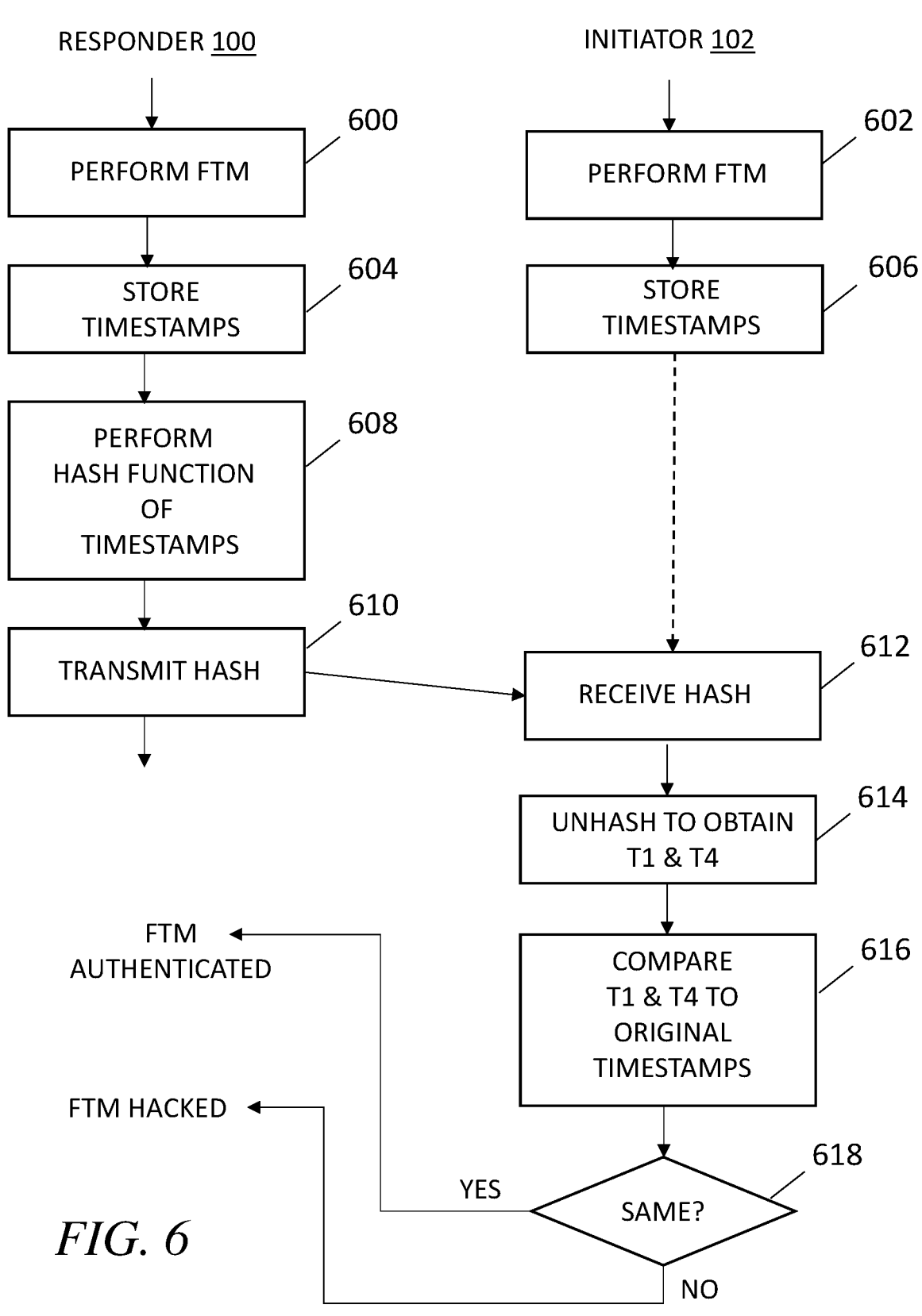
FIGS. 6 and 7 are simplified flowcharts illustrating two embodiments of the proposed secure FTM authentication solution according to one or more aspects of the present disclosure.

Referring to FIG. 6, a simplified flowchart of the FTM authentication process is shown. In blocks 600 and 602, the responder and initiator perform the FTM transaction by sending and receiving FTM and ACK message frames. The t1-t4 timestamps for each round of FTM-ACK messages received and observed by the initiator and responder are stored in memory, as shown in blocks 604 and 606. The responder then performs a hash function of the t1 and t4 timestamps and transmits the hash value to the initiator over a secure side channel, as shown in blocks 608 and 610. The initiator receives the hash value and unhashes it to recover the t1 and t4 timestamps, as shown in blocks 612 and 614. The initiator then compares the recovered timestamps to the corresponding t1 and t4 timestamps stored in its memory, as shown in block 616. If the timestamp values are the same, then the FTM messages are authenticated and no hacking or spoofing has been detected. However, if the timestamps do not match, then there is a high probability that the FTM process has been hacked and spoofed FTM messages were received by the initiator. In an alternate embodiment, the initiator may also calculate a hash value for its copy of the timestamps and compares the hash value to the hash value received from the responder via the side channel. If the hash values are not identical, then hacking has been detected. As shown in FIGS. 2 and 3, the authenticating message can be sent after each FTM-ACK message pair or after all of the FTM-ACK message pairs of the FTM transaction.

Figure 7:
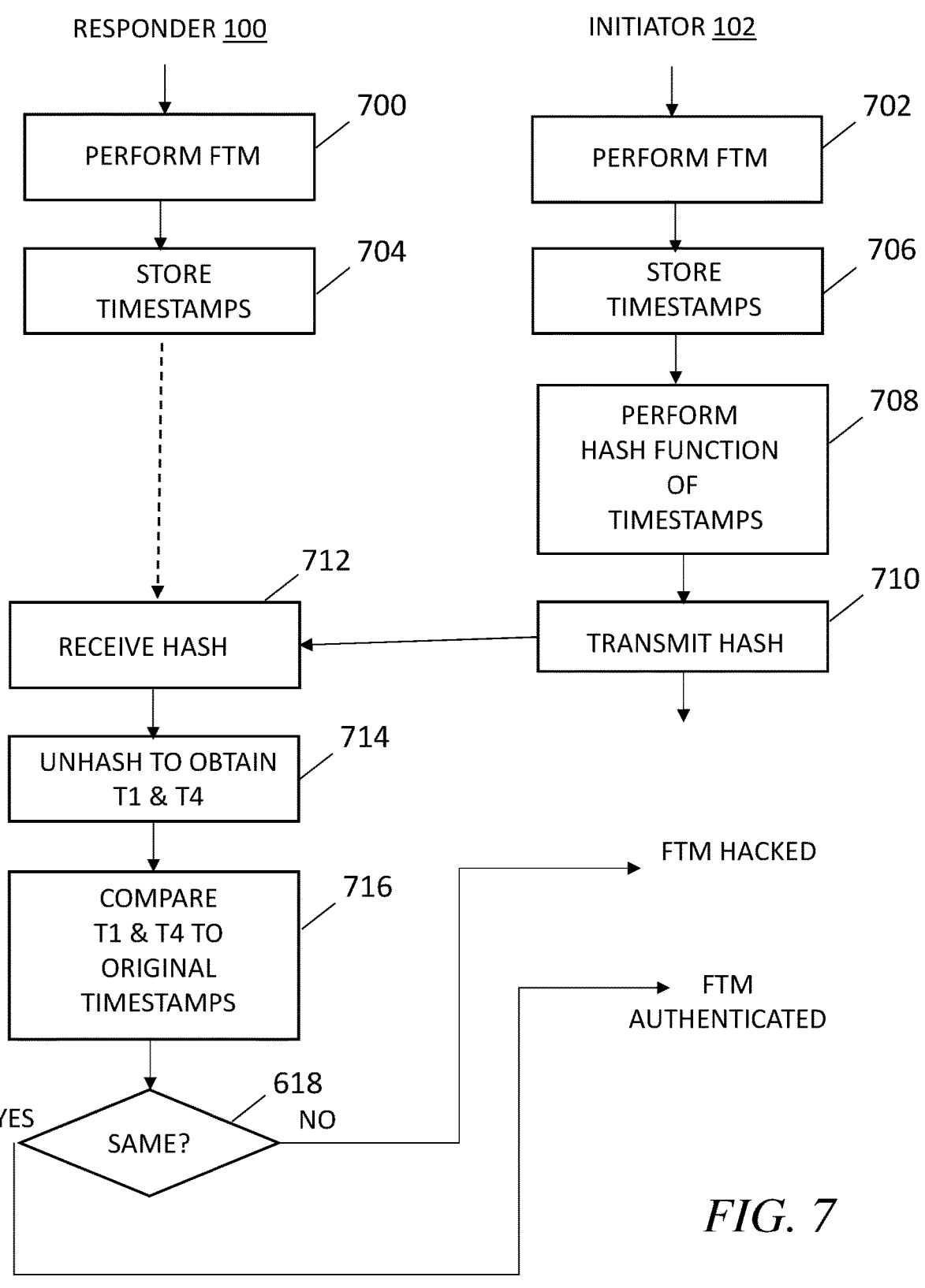

FIG. 7 is a simplified flowchart for another embodiment of the proposed solution where the initiator generates an authenticating value that is sent to the responder for comparison. Referring to FIG. 7, a simplified flowchart of the FTM authentication process is shown. In blocks 700 and 702, the responder and initiator perform the FTM transaction by sending and receiving FTM and ACK message frames as described above. The t1-t4 timestamps for each round of FTM-ACK messages received and observed by the initiator and responder are stored in memory, as shown in blocks 704 and 706. The initiator then performs a hash function of the t1 and t4 timestamps and transmits the hash value to the initiator over a secure side channel, as shown in blocks 708 and 710. The responder receives the hash value and unhashes it to recover the t1 and t4 timestamps, as shown in blocks 712 and 714. The responder then compares the recovered timestamps to the corresponding t1 and t4 timestamps stored in its memory, as shown in block 716. If the timestamp values are the same, then the FTM messages are authenticated and no hacking or spoofing has been detected. However, if the timestamps do not match, then there is a high probability that the FTM process has been hacked and spoofed FTM messages were received by the responder. The responder may send an AUTH ACK to the initiator to indicate the result of the comparison, i.e., whether hacking/spoofing has been detected. As shown in FIGS. 4 and 5, the authenticating message can be sent after each FTM-ACK message pair or after all of the FTM-ACK message pairs of the FTM transaction.

It should be noted that the term "side channel" is used herein to denote any communication channel or frequency band other than the WiFi channel that is used to transmit the FTM and ACK message frames. This may mean that the side channel occupies a different radio frequency band than the channel used for transmitting the FTM and ACK messages, where there may or may not have frequency overlap between the two channels. The side channel used to transmit the authenticating values (timestamps or hash values) may operate using any suitable protocol now known or later to be developed, including for example, WiFi, Bluetooth, ZigBee, Z-Wave, NFC, and cellular. The side channel may even include wireline communication channels. The side channel is preferably secured, encrypted, covert, demultiplexed, or otherwise protected by a technique now known or later to be developed. The FTM authentication data may be transmitted between the initiator and responder over one or more direct or indirect side channels and in either direction. The authenticating values can be computed and transmitted/received to verify the timestamps associated with each FTM-ACK exchange or to verify the timestamps associated with multiple FTM-ACK exchanges.

It should be noted that the system and method described herein may use any suitable hash function (e.g., MD5, SHA-1, RIPEMD-160, Whirlpool, SHA-2, SHA-3, BLAKE2, and BLAKE3) to generate the hash value of the timestamps. The use of a cryptographic hash function enables the initiator to recover the timestamps by reversing or decoding the hash value. Alternatively, the proposed solution herein may transmit the actual t1 and t4 timestamp values instead of a hash value of the timestamps to authenticate the timestamps in the FTM-ACK messages. In an alternate embodiment, a function other than a cryptographic hash function may be used to generate an authenticating value based on the FTM timestamps to verify the timestamps in the FTM-ACK messages. For example, a checksum, check digit, fingerprint, and other authenticating values may be sent to verify the FTM timestamps. In the alternate embodiment, both the initiator and the responder apply the same function to its own copy of the timestamps and the result of one is sent to the other endpoint for comparison. If the two results are not the same, then hacking has been detected.

IEEE 802.11 is part of the IEEE 802 set of local area network (LAN) technical standards and specifies the set of media access control (MAC) and physical layer (PHY) protocols for implementing wireless local area network (WLAN) computer communication. The standard and its amendments provide the basis for wireless network products such as mobile telephones, notepad computers, notebook computers, laptops, printers, and many other devices to communicate with each other and access the Internet without physical wires. IEEE 802.11 uses various frequencies including, but not limited to, 900 MHz, 2.4 GHz, 3.6 GHz, 4.9 GHz, 5 GHz, 5.9 GHz, 6 GHz, and 60 GHz frequency bands that are further subdivided into channels. For example, the 2.4 GHz band is divided into 14 channels spaced 5 MHz apart, beginning with channel 1, which is centered on 2.412 GHz. Although IEEE 802.11 specifications define channels that are available, the use of specific radio frequency spectrum is also heavily regulated by federal and state regulations and laws. The IEEE 802.11 standards specifications are incorporated herein by reference.

Figure 8:
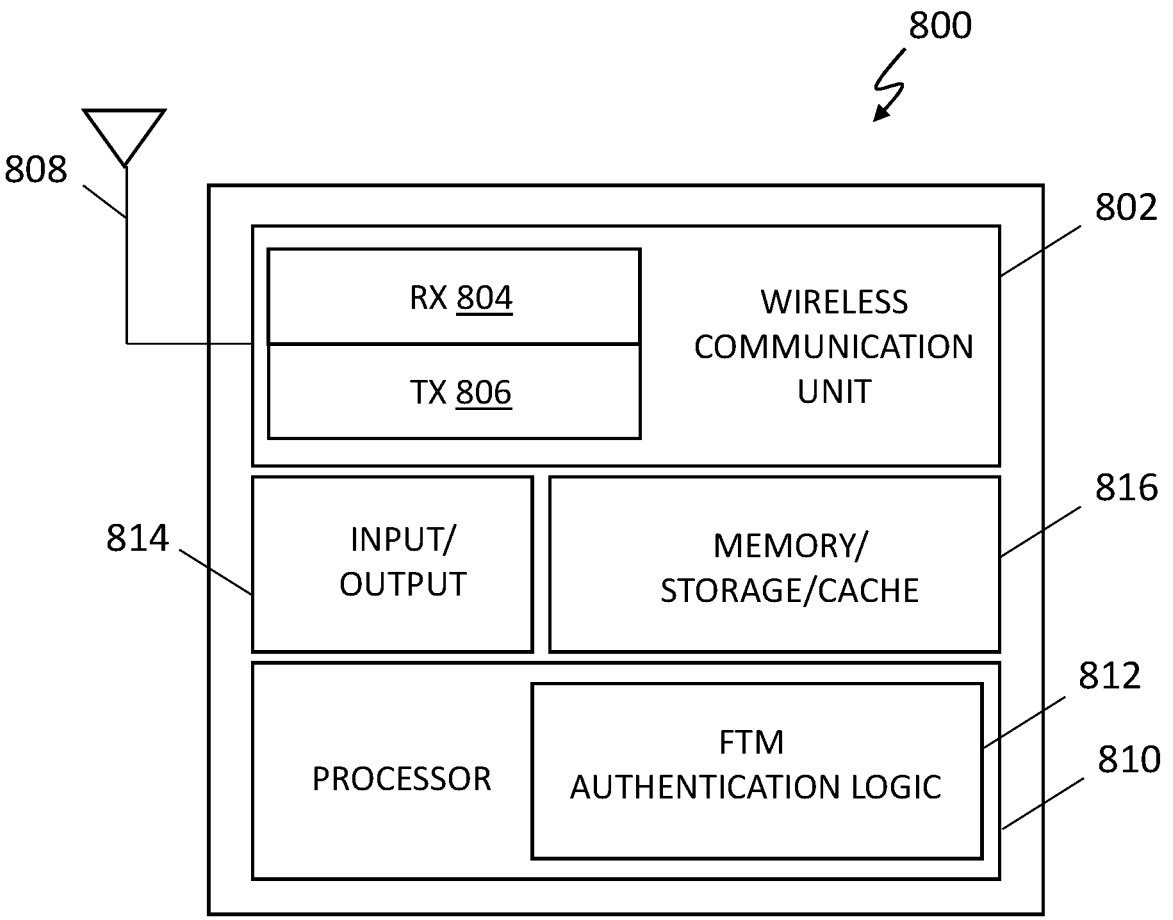
FIG. 8 is a simplified block diagram of a wireless communication device according to one or more aspects of the present disclosure.

FIG. 8 is a simplified block diagram of an example of a communication device 800 according to one or more aspects of the present disclosure. The communication device 800 may perform the functionality of a client station or an access point, either of which may function as the initiator or the responder in the FTM scenario described herein. The communication device 800 may include a router, a soft access point, and the like. The communication device 800 may further include, for example, a mobile phone, a desktop computer, a mobile computer, a laptop computer, a notebook computer, a tablet computer, a server computer, a handheld computer, a handheld device, a wearable device, a hybrid device (e.g., combining cellular phone functionalities with other functionalities), a consumer device, a non-mobile/non-portable device, a GPS device, and any device that has wireless communication capabilities.

The communication device 800 includes a wireless communication unit 802, which includes one or more wireless receivers 804, transmitters 806, and/or transceivers able to send and/or receive wireless signals, radio frequency signals, data and control frames, data and control blocks, data and control streams, data and control packets, and data and control messages. The wireless communication unit 802 further includes one or more antennae 808 that enables receiving and transmitting wireless signals transmitted over one or more predetermined frequency bands, including the communication channel used for the FTM transaction and the side channel used for FTM authentication described herein.

The communication device 800 further includes a processor 810, an input/output unit 812, and a memory/storage/cache unit 814. Mobile device 120 may optionally include other suitable hardware components and/or software components. The processor 810 may include one or more of the following: a Central Processing Unit (CPU), a Digital Signal Processor (DSP), a programmable logic unit, an Application-Specific IC (ASIC), and any other suitable processor or controller. The processor 810 of the communication device 800 further includes FTM authentication logic 812 that performs the FTM authentication method described herein.

The communication device 800 further includes input and output devices 814 that may include, for example, a screen, a display, a keyboard, a keypad, a mouse, a touch-screen, a touch-pad, a track-ball, a stylus, a microphone, and other suitable devices. The memory/storage/cache unit 816 may include one or more of the following: a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, and other suitable devices capable of storing data.

The features of the present invention which are believed to be novel are set forth below with particularity in the appended claims. However, modifications, variations, and changes to the exemplary embodiments of the system and method described above will be apparent to those skilled in the art, and the system and method described herein thus encompasses such modifications, variations, and changes and are not limited to the specific embodiments described herein.

What is claimed is:

1. A method, comprising:

receiving, via a first communication channel, a first fine time measurement (FTM) message including a departure timestamp of a previous FTM message and an arrival timestamp of a previous acknowledgement (ACK) message corresponding to the previous FTM message;

sending, via the first communication channel, a corresponding first ACK message in response to receiving the first FTM message;

receiving, via a second communication channel, an authenticating value indicative of the time of departure and arrival timestamp values of at least the first FTM message and at least the first corresponding ACK messages; and authenticating the first FTM and ACK time of departure and arrival timestamps in response to evaluating the authenticating value, comprising:

recovering the departure and arrival timestamp values from the received authenticating value;

comparing the recovered timestamp values with observed FTM-ACK time of departure and arrival timestamps; and authenticating the time of departure and arrival timestamps in response to a match between the compared timestamp values.

2. The method of claim 1, wherein receiving the authenticating value via a second communication channel comprises receiving a hash value of the timestamp values via a secure side channel.

3. The method of claim 1, wherein receiving the authenticating value via the second communication channel comprises receiving the authenticating value after transmission of each ACK message in response to receiving an FTM message, the authenticating value indicative of timestamp values of the FTM and ACK message arrival and departure times.

4. The method of claim 1, wherein receiving the authenticating value via the second communication channel comprises receiving the authenticating value after transmission of each ACK message in response to receiving an FTM message, the authenticating value indicative of a hash value of the FTM and ACK message arrival and departure timestamps.

5. The method of claim 4, wherein authenticating the first FTM and ACK time of departure and arrival timestamps comprises:

determining the departure and arrival timestamp values from the received hash value;

comparing the recovered timestamp values with observed FTM-ACK time of departure and arrival timestamps; and authenticating the time of departure and arrival timestamps in response to a match between the compared timestamp values.

6. The method of claim 1, wherein receiving the authenticating value via the second communication channel comprises receiving the authenticating value at an FTM initiator.

7. The method of claim 1, wherein receiving the authenticating value via the second communication channel comprises receiving the authenticating value at an FTM responder.

8. A device, comprising:

a transceiver; and a processor coupled to the transceiver, the processor configurable to:

receive, via the transceiver over a first communication channel, a first fine time measurement (FTM) message including a previous FTM message departure timestamp and a previous corresponding acknowledgement (ACK) message arrival timestamp;

transmit, via the transceiver over the first communication channel, a corresponding first ACK message in response to receiving the first FTM message;

receive, via the transceiver over a second communication channel, a hash value indicative of the time of departure and arrival timestamp values of at least the first FTM message and at least the first corresponding ACK messages, wherein the second communication channel is a secure side channel; and evaluate the hash value and authenticate the first FTM and ACK time of departure and arrival timestamps based on evaluating the hash value.

9. The device of claim 8, wherein the processor is further configurable to:

recover the departure and arrival timestamp values from the hash value;

compare the recovered timestamp values with observed FTM-ACK time of departure and arrival timestamps; and authenticate the time of departure and arrival timestamps in response to a match between the compared timestamp values.

10. The device of claim 8, wherein receiving the hash value via a second communication channel comprises receiving the hash value after transmission of each FTM-ACK message pair indicative of timestamp values of the FTM and ACK message arrival and departure times.

11. The device of claim 8, wherein receiving the hash value via a second communication channel comprises receiving the hash value at an FTM responder.

12. The device of claim 8, wherein receiving the hash value via a second communication channel comprises receiving the hash value at an FTM initiator.

13. A non-transitory computer-readable storage medium having encoded thereon a computer-executable method comprising:

receiving, via a first communication channel, a first fine time measurement (FTM) message including previous FTM message departure timestamp and previous corresponding acknowledgement (ACK) message arrival timestamp;

sending, via the first communication channel, a corresponding first ACK message in response to receiving the first FTM message;

receiving, via the first communication channel, a second FTM message including time of departure timestamp of the first FTM message and a time of arrival timestamp for the corresponding first ACK message;

sending, via the first communication channel, a corresponding second ACK message in response to receiving the second FTM message;

receiving, via a second communication channel, an authenticating value after transmission of each FTM-ACK message pair indicative of timestamp values of FTM and ACK message arrival and departure times, the authenticating value indicative of the time of departure and arrival timestamp values of at least one of the first and second FTM messages and at least one of the first and second corresponding ACK messages; and authenticating the time of departure and arrival timestamps in response to evaluating the authenticating value.

14. The non-transitory computer-readable storage medium of claim 13, the method further comprising:

recovering the timestamp values from the received authenticating value;

comparing the recovered timestamp values with observed FTM-ACK time of departure and arrival timestamps; and authenticating the time of departure and arrival timestamps in response to a match between the compared timestamp values.

15. The non-transitory computer-readable storage medium of claim 13, wherein receiving the authenticating value via the second communication channel comprises receiving a hash value of the timestamp values via a secure side channel.

16. The non-transitory computer-readable storage medium of claim 13, wherein receiving the authenticating value via the second communication channel comprises receiving the authenticating value from an FTM initiator to an FTM responder.

17. The non-transitory computer-readable storage medium of claim 13, wherein receiving the authenticating value via the second communication channel comprises receiving the authenticating value from an FTM responder to an FTM initiator.

* * * * *